Dec. 25, 1945.  L. JACOBI  2,391,783
TRANSMISSION
Filed Sept. 26, 1941  2 Sheets-Sheet 2
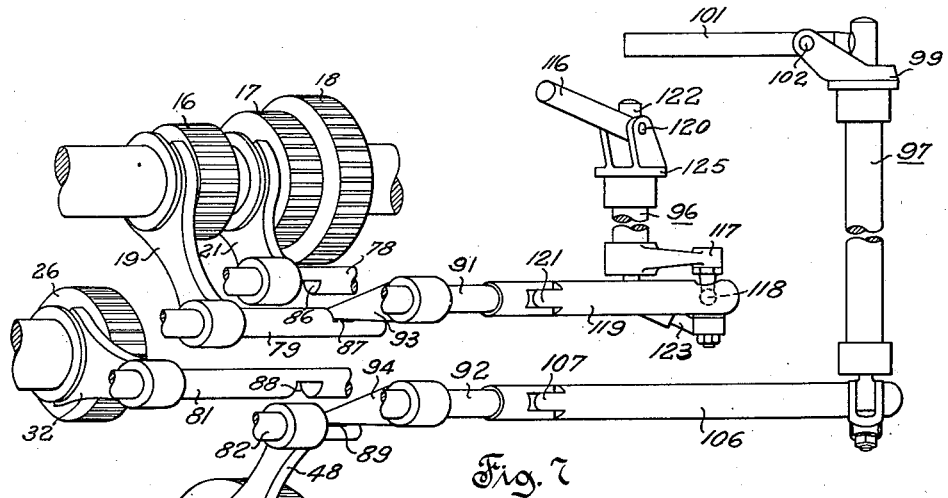
Fig. 7
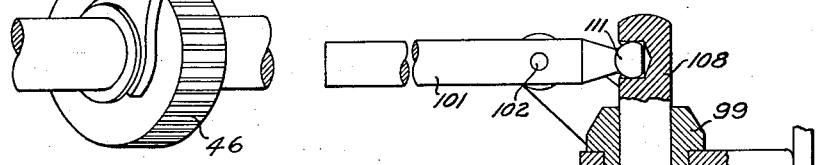
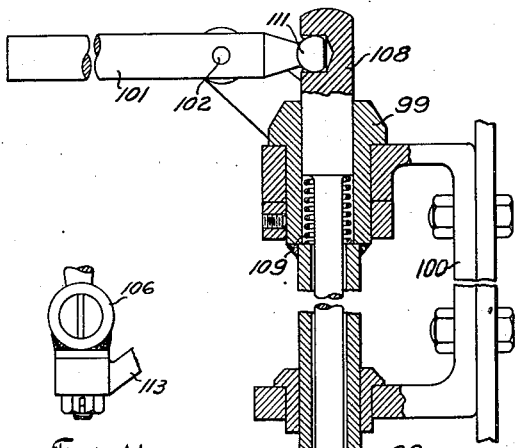
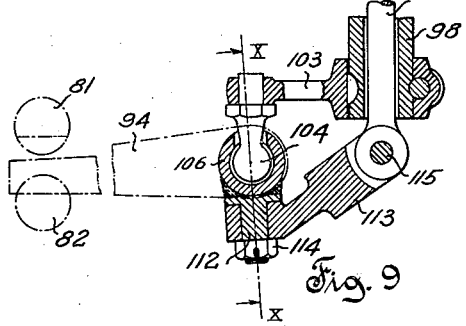
Fig. 10  Fig. 11
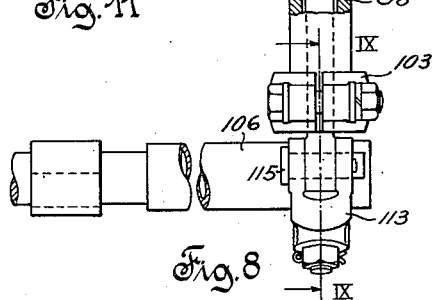
Fig. 9  Fig. 8
Inventor
L. Jacobi
by
Attorney Patented Dec. 25, 1945

2,391,783

UNITED STATES PATENT OFFICE 2,391,783

TRANSMISSION

Louis Jacobi, West Allis, Wis., assignor to Allis-Chalmers Manufacturing Company, Milwaukee, Wis., a corporation of Delaware Application September 26, 1941, Serial No. 412,361

10 Claims. (Cl. 74—333)

The invention relates to change speed transmissions of the type in which a plurality of gear combinations are available for establishing individual driving connections between the driving and driven shafts, and in which the gear combinations afford different driving characteristics, such as different speed ratios and different directions of rotation of the driven shaft relative to the driving shaft.

In the operation of tractor drawn or self-propelled road graders, scrapers and similar machinery, it is desirable to provide for a plurality of forward and reverse "working speeds" affording a relatively low rate of travel, for instance, up to six or seven miles per hour in either direction, and for a plurality of "traveling speeds" affording a relatively high rate of speed, for instance, up to seventeen or eighteen miles per hour. The traveling speeds are preferably made available for forward travel only since it would ordinarily be difficult to steer the machine safely at a high reverse speed.

It is an object of the invention to provide a transmission which satisfies the foregoing requirements for a low and a high forward speed range and for a reverse speed range, and in which the low and reverse speed ranges afford suitable working speeds up to approximately the same limit, while the high speed range affords a number of traveling speeds beyond that limit for forward drive only.

More specifically it is an object of the invention to provide a transmission of the mentioned character in which the number of speeds available in the low speed range is equal to the number of speeds available in the reverse speed range, and in which the number of speeds available in the high speed range is preferably also equal to the number of speeds available in the low speed range.

In machines of the mentioned character, the rate of travel may be varied, at any selected speed ratio of the transmission, by controlling the speed of the internal combustion engine which furnishes the propelling power. It is a further object of the invention to provide a three range transmission of the type referred to hereinbefore, in which the gear combinations affording the several forward speed ratios are so proportioned that by control of the engine speed at properly selected speed ratios of the transmission the machine may be operated at any rate of forward travel within the top speed limit, and in which the gear combinations affording the reverse speeds are also so proportioned that any rate of reverse travel, within the reverse top speed limit, may be obtained by control of the engine speed at properly selected reverse speed ratios of the transmission.

In the three range transmission, as contemplated by the invention, the driving and driven shafts are rotatable about relatively spaced axes, the driven shaft being preferably arranged a substantial distance below the driving shaft, and a series of drivingly interconnected gears are rotatably mounted in radially offset positions relative to said driving and driven shafts. Rotation of the driving shaft is transmitted to the series of drivingly interconnected gears at selectable speed ratios, suitable driving gears being arranged coaxially with the driving shaft, and selectively operable means being provided to drivingly connect the driving gears, respectively, with said series of interconnected gears. In the preferred embodiment of the invention the number of available speed ratios between the driving shaft and the series of drivingly interconnected gears is equal to the number of speeds desired for the low speed range, and the same number of speeds which are available in the low speed range are also available in each of the reverse and high speed ranges. In order to accomplish this result and to establish the specific relations between the speed ratios of the three ranges, the invention contemplates a range selecting mechanism for transmitting power from the series of drivingly interconnected gears to the driven shaft at such speed ratios as are required to substantially match the speeds of the low speed range with the speeds of the reverse speed range, and to top the speeds of the low speed range by the speeds of the high speed range.

The range selecting mechanism, in its preferred form, comprises an auxiliary gear coaxial with and rotatable independently of the driven shaft, in constant mesh with one of said series of interconnected gears, and a shiftable gear coaxial with and nonrotatably connected to the driven shaft, the auxiliary gear and shiftable gear having clutch teeth which may be engaged by axial movement of the shiftable gear in one direction, and the shiftable gear being movable in the other direction into mesh with another of said series of interconnected gears. Clutching engagement of the shiftable gear with the auxiliary gear affords the low speed range, and meshing engagement of the shiftable gear with the other of said drivingly interconnected gears affords the high speed range. By this arrangement the required relation between the speed ratios of the high and low speed ranges may conveniently be incorporated in the transmission with a relatively small number of gears and within a relatively small space.

The range selecting mechanism, in its preferred form, further includes a reverse drive connection between the series of drivingly interconnected gears and the driven shaft, which operates to rotate the driven shaft at approximately the same speed ratio as the constantly meshing gears, but in the opposite direction. In this manner the available speeds in the reverse speed range are made equal in number to and they are approximately matched with the available speeds of the forward low speed range.

Control of the range selecting mechanism is preferably effected by a single control element which is adjustable to three different positions, one corresponding to the low speed range, another corresponding to the high speed range, and the third corresponding to the reverse speed range. The available speed ratios between the driving shaft and the series of interconnected gears are preferably selected by another control element which may be manipulated by an operator independently of the control element for the range selecting mechanism.

The provision of two independently operable control elements, one for the range selecting mechanism, and the other for the speed selecting mechanism, permits the operator to reverse the direction of propulsion of the machine without attending to the speed selecting mechanism. That is, if he is working in any low forward speed he may stop and throw the range selector from forward to reverse, and upon starting again he will then be working in reverse at approximately the same speed at which he was working forward. For certain operations, as in road grading, it is desirable that the machine can be controlled in this manner. Moreover, the provision of two control elements in the mentioned arrangement enables the driver to select any speed without looking at the controls, which is desirable when operating at night.

A further object of the invention is to provide a change speed transmission which is simple and compact in construction, efficient in operation, and which may be manufactured at relatively low costs.

The foregoing and other objects and advantages of the invention will become more fully apparent from the following description of a preferred embodiment of the invention shown in the accompanying drawings. Referring to the drawings, in which like reference characters designate the same or similar parts in the several views:

Fig. 7 is a perspective and partly schematic view of a shift mechanism for the transmission shown in Fig. 1;

Fig. 8 is an enlarged view, partly in section, of a control column and associated parts incorporated in the shift mechanism shown in Fig. 7;

Fig. 9 is a section on line IX—IX of Fig. 8;

Fig. 10 is a section on line X—X of Fig. 9; and

Fig. 11 is an end view of the parts shown in Fig. 10.

Figure 1:
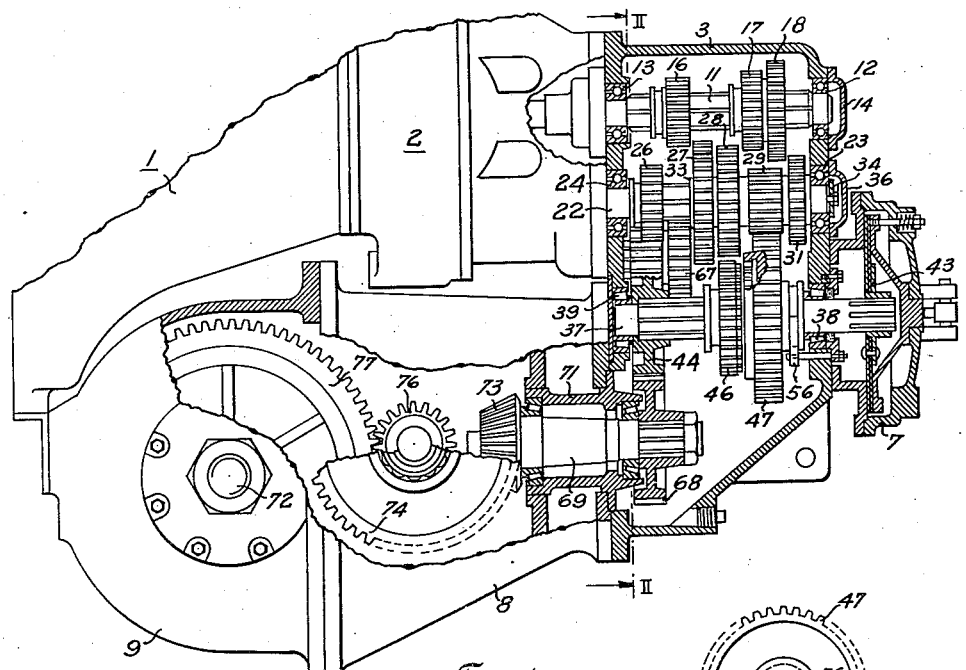
Fig. 1 is a side view of a transmission and associated drive mechanism for a motor grader, the transmission being shown in section on line I—I of Fig. 2.
Figures 2, 3, 5, 6:
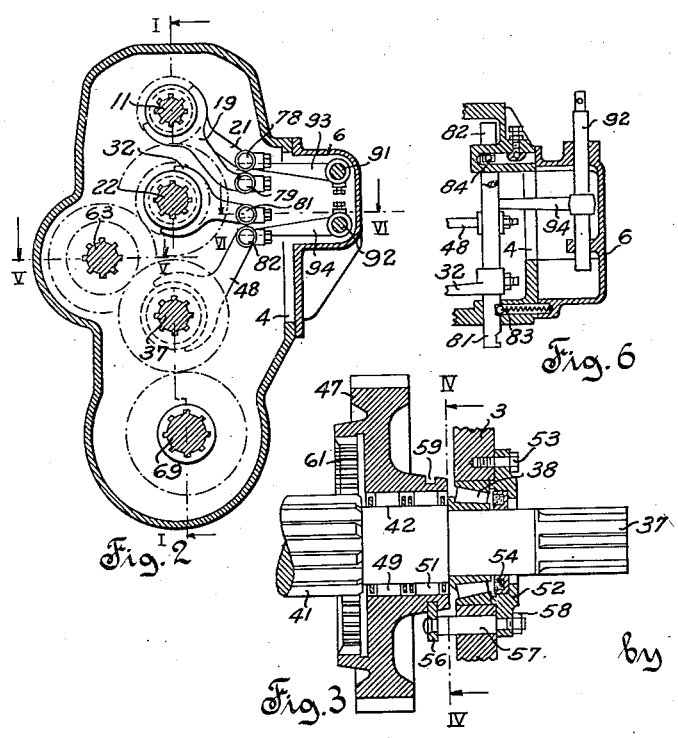
Fig. 2 is a sectional view on line II—II of Fig. 1.
Fig. 3 is an enlarged sectional view of a detail of the transmission shown in Fig. 1.
Fig. 5 is a sectional view on line V—V of Fig. 2.
Fig. 6 is a sectional view on line VI—VI of Fig. 2.

As has been mentioned in connection with Fig. 1, the transmission and associated parts shown in this figure are intended for use in a motor grader, and part of the internal combustion engine of the grader is generally indicated by the reference character 1. A clutch housing 2 is shown as being secured to the forward end of the engine 1, and secured to the forward end of the clutch housing 2 is a transmission housing 3 which has straight front and rear walls, as shown in Fig. 1, and somewhat irregular top, bottom and side walls, as shown in Fig. 2. A relatively large opening 4 in one of the side walls is covered by a cap housing 6, and secured to the front wall of the transmission housing 3 is a brake housing 7. The transmission housing 3 has an upper portion opposite to the clutch housing 2 and a downwardly extending lower portion, to the rear wall of which is secured a gear housing 8 underlying the clutch housing 2, and an axle housing 9 is secured to the rear of the gear housing 8.

Mounted in the upper portion of the transmission housing 3 is a splined driving shaft 11 which is rotatably supported at its opposite ends in alined openings of the front and rear walls of the transmission housing 3 by ball bearings 12 and 13, respectively. The front opening for the bearing 12 is closed by a detachable cover 14, and the shaft 11 extends through the bearing 13 into the clutch housing 2, suitable clutch mechanism, not shown, being enclosed within the clutch housing for coupling the driving shaft 11 with the crankshaft of the engine 1 and for uncoupling it therefrom. Driving gears 16, 17 and 18 of successively increased diameters are arranged coaxially with the driving shaft 11 and have internal splines cooperating with the splines of the driving shaft so that they will rotate in unison with the latter but may be shifted axially thereof. The gear 16 has a grooved collar for engagement by a shifter fork 19, shown in Figs. 2 and 7, and the gears 17 and 18 are connected together to form a gear cluster which has a grooved collar for engagement by a shifter fork 21 shown in Figs. 2 and 7.

A lay shaft 22 directly below the driving shaft 11 is rotatably supported at its opposite ends in alined openings of the front and rear walls of the transmission housing 3 by means of ball bearings 23 and 24, respectively. The portion of the lay shaft 22 between the bearings 23 and 24 has longitudinal splines extending throughout the length of said shaft between its bearings, and alined on the splined portion of the lay shaft are five gears indicated by the reference characters 26, 27, 28, 29 and 31, respectively. The gear 26 has internal splines cooperating with the splines of the lay shaft 22 so that the gear 26 may rotate in unison therewith but may be shifted axially thereof. A grooved collar on the gear 26 is engaged by a shifter fork 32 shown in Figs. 2 and 7. The gears 27, 28, 29 and 31 are separately formed and are each provided with internal splines cooperating with the splines of the lay shaft so that they will rotate in unison therewith. The hub of the gear 27 abuts against a snap ring 33 axially fixed on the shaft 22 at the side of the gear 27 facing the gear 26, and the hub of the gear 31 abuts against the inner race of the ball bearing 23. The relatively adjacent faces of the hubs of the gears 27, 28, of the gears 28, 29, and of the gears 29 and 31 abut each other, and the entire row of gears 27, 28, 29 and 31 is compressed between the snap ring 33 and the inner race of the bearing 23 by means of a screw and washer 34 at the forward end of the shaft 22. The bearing opening for the shaft 22 in the front wall of the transmission housing, and the screw and washer 34 are covered by a detachable cap 36.

The gears 26, 27, 28, 29 and 31 form a series of drivingly interconnected gears which are rotatably mounted in radially offset positions relative to the driving shaft 11, and to which series rotation of the driving shaft may be transmitted at different speed ratios, a first, or low speed ratio being afforded by mesh of the gear 16 with the gear 27; a second, or intermediate speed ratio being afforded by mesh of the gear 17 with the gear 28; and a third, or high speed ratio being afforded by mesh of the gear 18 with the gear 31. The gears 27, 28 and 31 are counter gears for establishing the mentioned speed ratios, and the gears 26 and 29 are auxiliary gears to which further reference will be made hereinbelow.

Mounted in the lower portion of the housing 3, directly below the lay shaft 22, is a driven shaft 37, which is rotatably supported in alined openings of the front and rear walls of the housing by means of conical roller bearings 38 and 39, respectively. The portion of the shaft 37 between the bearings 38 and 39 comprises a splined section 41 of relatively great length, and a cylindrical section 42 of relatively short length, adjacent to the bearing 38, the diameter of the cylindrical section 42 being the same as the diameter of the solid part of the splined section, that is, the body part of the shaft from which the splines rise radially, as more clearly shown in Fig. 3. The driven shaft 37 extends through the bearing 38 into the brake housing 7, and a friction disk 43 forming part of a transmission brake mechanism for the grader is secured to the forward end of the driven shaft 37 for rotation therewith within the brake housing 7.

Alined on the driven shaft 37 within the housing 3 are three gears designated by the reference characters 44, 46 and 47, respectively. The gear 44 has internal splines cooperating with the splined section 41 of the shaft 37 so as to rotate in unison therewith, and provisions are made for retaining the gear 44 against displacement axially of the shaft 37 from the position in which the gear 44 is shown in Fig. 1. For that purpose an inwardly projecting annular shoulder may be formed on the hub of the gear 44 at the end thereof adjacent to the bearing 39, and a short space may be left between the inner race of the bearing 39 and the splines of the section 41, for accommodating said annular hub shoulder of the gear 44. Axial contact of the shoulder with the ends of the splines on the shaft 37 limits forward movement of the gear 44 axially of the shaft, and axial contact of the shoulder with the inner race of the bearing 39 limits rearward movement of the gear 44 within the housing 3.

The gear 46 is non-rotatably connected to the shaft 37 by means of internal splines which cooperate with the splines of the section 41, and it is shiftable axially of said shaft, in opposite directions from the position in which it is shown in Fig. 1, a grooved collar on the gear 46 being engaged by a shifter fork 48, as shown in Figs. 2 and 7. A circumferential portion of the gear 46 of an axial width equal to the tooth width of the gear 27 has teeth of full height adapted to mesh with the teeth of the gear 27, and each tooth of the gear 46 is extended axially towards the gear 47 and reduced in height to form a series of clutch teeth on the gear 46. Fig. 1 shows the gear 46 in a position opposite to the gear 28, in which position the gear 46 is out of mesh with the gear 27 and the clutch teeth of the gear 46 are disengaged from the gear 47. The combined length of the pitch radii of the gears 28 and 46 is shorter than the spacing between the axes of said gears to permit rotation of the gears 28 and 46 independently of each other when the gear 46 is adjusted to its neutral position in which it overlaps the gear 28, as shown in Fig. 1.

Referring to Fig. 3, the gear 47 has an axial bore in its hub of substantially larger diameter than the diameter of the cylindrical shaft section 42, and of slightly larger diameter than the outside diameter of the splined section 41 of the shaft 37. The gear 47 is mounted coaxially with the shaft 37 for rotation independently thereof by means of two cylindrical roller bearings 49 and 51 arranged side by side within the bore of the gear 47, the cylindrical outer surface of the shaft 42 providing the inner race surface for the rollers of the roller bearings, and the bore in the hub of the gear 47 being straight from end to end and smooth to provide the outer race surface for the rollers of the bearings 49 and 51.

Referring to Fig. 1, it will be seen that the shaft 37 is retained in an axially fixed position within the housing 3 by means of the conical roller bearings 38 and 39, and shims may be interposed between the bearing retainer 52 and the housing 3 in order to adjust the conical roller bearings for free running of the shaft 37 without appreciable axial play.

Figure 4:
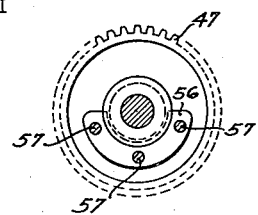
Fig. 4 is a view on line IV—IV of Fig. 3.

Referring to Figs. 3 and 4, a semi-annular plate 56 is mounted in the housing 3 below the hub of the gear 47 by means of three horizontal studs 57 which are supported in three bores, respectively, of the forward wall of the transmission housing, and each of which studs has a reduced portion extending through the bearing retainer 52. The reduced portions of the studs 57 are threaded, and nuts 58 on the studs are drawn up against the bearing retainer 52 to hold the studs and semi-annular plate 56 in an axially fixed position relative to the housing 3. The semi-annular plate 56 has an arcuate edge within a circumferential groove 59 in the hub of the gear 47, and the opposite side faces of the plate 56 cooperate with the vertical side walls of the groove 58 to secure the gear 47 against displacement axially of the shaft 37.

Features of the transmission involving the gear mounting shown in Figs. 3 and 4, not claimed herein, are claimed in a divisional application, Serial No. 438,262, filed April 9, 1942, for Power transmitting mechanism.

The gear 47, in the axially fixed position in which it is held by the retainer plate 56, is in constant mesh with the auxiliary gear 29, and a series of internal clutch teeth 61 are formed within a ring portion at the side of the gear 47 facing the gear 46. Forward shifting movement of the gear 46 axially of the shaft 37 from the position in which it is shown in Fig. 1 will couple the gear 47 with the shaft 37 for rotation in unison therewith, and when the gear 47 is so coupled with the shaft 37, the speed ratio of the shaft 37 relative to the series of drivingly interconnected gears 26 to 31 is determined by the gear ratio of the gears 29 and 47. On the other hand, if the gear 46 is shifted from the position in which it is shown in Fig. 1 towards the rear into mesh with the gear 27, the speed ratio of the shaft 37 relative to the series of interconnected gears 26 to 31 is determined by the gear ratio of the gears 27 and 46, and the latter gear ratio is such as to afford a higher speed of the driven shaft 37 than the gear ratio of the premanently meshing gears 29 and 47.

Assuming that the gear 47 has been coupled to the shaft 37 by engagement of the clutch teeth of the gear 46 with the clutch teeth 61 of the gear 47, a first or relatively low working speed of the driven shaft may be obtained by meshing the gear 16 with the gear 27. Meshing engagement of the gear 17 with the gear 28, while the gear 47 is coupled to the shaft 37, affords a second or intermediate working speed of the shaft 37, and meshing engagement of the gear 18 with the gear 31, while the gear 47 is coupled to the shaft 37, affords a third or relatively high working speed of the shaft 37. A low forward speed range comprising three speeds is thus established by coupling the gear 47 to the shaft 37.

Assuming next that the gear 46 has been moved into mesh with the gear 27, a first or relatively low traveling speed, which is higher than the highest working speed, may be obtained by meshing the gear 16 with the gear 27; and meshing engagement of the gears 17 and 18 with the gears 28 and 31, respectively, while the gear 46 is in mesh with the gear 27, affords a second or intermediate, and a third or relatively high traveling speed of the driven shaft 37. A high forward speed range comprising three speeds is thus established by meshing the gear 46 with the gear 27.

The gear 44 is in constant mesh with a gear 62 which is non-rotatably secured to a shaft 63 mounted in a pair of bearings 64 and 66, as shown in Fig. 5. The axis of the shaft 63 is spaced from the axes of the shafts 22 and 37 as shown in Fig. 2, and a second gear 67 secured to the shaft 63 coaxially with the gear 62 is mounted within the housing 3 in such a position that it may be meshed with the gear 26 by shifting movement of the latter axially of the shaft 22 in a forward direction from the position in which the gear 26 is shown in Fig. 1. The pitch diameter of the gear 67, which is larger than the pitch diameter of the gear 62, is also larger than the pitch diameter of the gear 26, and the pitch diameter of the gear 26, in turn, is smaller than the pitch diameter of the driven gear 44. In other words, the gear cluster 62, 67 constitutes a reverse idler which has a first gear section 67 of larger pitch diameter than the gear 26, adapted to mesh with the latter, and a second gear section 62 of smaller pitch diameter than said first gear section, adapted to mesh with the driven gear 44, and the pitch diameter of the driven gear 44 is larger than the pitch diameters of the gear 26 and of the second gear section 62 of the reverse idler. More specifically, the mentioned pitch diameters are so proportioned that the gear ratio of the gear train afforded by the gears 26, 67, 62 and 44 is approximately the same as the one afforded by the constantly meshing gears 29 and 47, and it will be seen that by meshing the gear 26 with the gear 67, while the gear 46 is in the neutral position in which it is shown in Fig. 1, a third speed range is made available for rotating the shaft 37 at approximately the same speeds as in the low forward speed range but in a reverse direction, selection of any reverse speed being accomplished, like that of any forward speed, by means of the speed selecting gearing comprising the gears 16, 17 and 18, and the counter gears 27, 28 and 31.

It will be noted that the transmission affords three relatively low forward working speeds, three relatively high forward traveling speeds, and three reverse working speeds of substantially the same ratios as the relatively low forward working speeds, and that this is accomplished by making the three speed changes afforded by the speed selecting gearing 16, 17, 18, 27, 28 and 31 available for each of the mentioned three speed ranges, that is, for the low forward speed range, for the high forward speed range, and for the reverse speed range. The gearing for establishing the ranges, or the range selecting gearing, comprises the gear 29 which may be termed a first auxiliary gear, the gear 47 which may be termed a second auxiliary gear, the shiftable gear 46 which may be termed a first driven gear, the gear 44 which may be termed a second driven gear, the gear 26 which may be termed a third auxiliary, and the gear cluster 62, 67 which may be termed a reverse idler or reverse gearing.

The gear 44 is also in constant mesh with a work shaft gear 68 which constitutes a third driven gear and which is non-rotatably secured to a work shaft 69 journaled in a bearing carrier 71 of the gear housing 8. Rotation of the work shaft 69 is transmitted to the driving axle 72 of the motor grader through a gear train comprising intermeshing bevel gears 73 and 74 and intermeshing spur gears 76 and 77 enclosed in suitable portions of the gear casing 8 and axle housing 9.

Referring to Figs. 2 and 6 to 11, the control mechanism for the shifter forks 19, 21, 32 and 48 is constructed as follows. Mounted on the housing 3 for sliding movement in a fore and aft direction are four shifter shafts 78, 79, 81 and 82 on which the forks 21, 19, 32 and 48 are secured, respectively, so that each fork may be shifted by axial movement of its respective shaft. A suitable detent mechanism 83 (Fig. 6) cooperates with each shaft to resiliently lock each shaft against axial movement before and after it is shifted from one position to another, and a suitable interlock mechanism 84 between the shafts 81 and 82 positively locks either one of these shafts against axial movement after the other has been shifted into a drive establishing position. A similar interlock mechanism is provided for the shafts 78 and 79.

The shaft 78 has a notch 86 (Fig. 7) at the side thereof facing the shaft 79, and the shaft 79 has a similar notch 87 at the side thereof facing the shaft 78. Similar notches 88 and 89 are formed in the shafts 81 and 82, respectively. Fig. 1 shows the speed selecting gear 16 and the speed selecting gear cluster 17, 18 in their neutral positions, and the notches 86 and 87 are so arranged in the shafts 78 and 79 that in the positions of these shafts corresponding to the neutral positions of the gear 16 and of the gear cluster 17, 18, the notch 87 lies directly opposite to the notch 86. Fig. 1 also shows the gear 26 and the shiftable driven gear 46 in their neutral positions, and the notches 88 and 89 of the shafts 81 and 82, respectively, are so arranged that the notch 89 lies directly opposite to the notch 88 in the position of the shafts 81 and 82 corresponding to the neutral positions of the gears 26 and 46.

Referring to Figs. 2 and 6, an upper selector shaft 91 and a lower selector shaft 92 are mounted in axially alined bearings of the cap housing 6, each selector shaft being axially slidable in its respective bearings and rockable therein about its axis. An operating arm 93 is secured to the selector shaft 91 within the cap housing 6 and extends laterally therefrom into the notch 86 of the shifter shaft 78. The lower selector shaft 92 has a similar arm 94 which extends into the notch 89 of the shifter shaft 82. The arms 93 and 94 are rigidly secured to their respective shafts 91 and 92, and axial movement of the selector shaft 91 will therefore by transmitted to the shaft 78 when the arm 93 engages the notch 86. When the transmission is in neutral and the notch 87 in the shaft 79 registers with the notch 86 in the shaft 78, as has been pointed out hereinbefore, the arm 93 may be swung downwardly out of the notch 86 into the notch 87 by rocking movement of the selector shaft 91 in an anti-clockwise direction, as viewed in Fig. 2, and axial movement of the selector shaft 91 will then be transmitted to the shifter shaft 79 while the shifter shaft 78 remains in its neutral position.

Similarly, when the transmission is in neutral and the notch 89 of the shaft 82 registers with the notch 88 in the shaft 81, the arm 94 on the selector shaft 92 may be lifted out of engagement with the notch 89 and into engagement with the notch 88 by rocking movement of the shaft 92 within its bearings in a clockwise direction, as viewed in Fig. 2. Axial movement of the selector shaft 92 may therefore be transmitted to either the shaft 82 or the shaft 81.

Mounted on the grader within reach from the operator's station are two control columns generally indicated by the reference characters 96 and 97 in Fig. 7, for shifting and rocking the selector shafts 91 and 92, respectively. Referring to Fig. 8, the control column 97 for the selector shaft 92 comprises a vertical tube 98 which is rotatably mounted in a bracket 100 on the grader. Secured to the upper end of the tube 98 is a head 99 which has a pair of arms on which a hand lever 101 is mounted by means of a pivot pin 102. By taking hold of the hand lever 101, the operator may turn the tube 98 about its axis to the right or left, and such turning movement of the tube 98 is transmitted to the selector shaft 92 by means of an arm 103 which is secured to the lower end of the tube 98 and which has a ball and socket connection 104 with a horizontal tube 106, the tube 106 having a flexible joint connection 107 with the selector shaft 92.

A vertically movable control rod 108 extends through the tube 98 and has an enlarged head within the head 99, a coil spring 109 being interposed between the head of the control rod 108 and the upper end of the tube 98 to exert a lifting force on the control rod 108. The hand lever 101 has a ball portion 111 within a recess in the head of the control rod 108, and pivotal movement of the hand lever 101 about the pivot pin 102 in a clockwise direction as viewed in Fig. 8 will cause downward movement of the control rod 108 within the tube 98 against the pressure of the spring 109. Secured to the tube 106 below the ball and socket connection 104 is a shoulder pin 112, and a rock arm 113 is pivotally mounted on the shoulder pin 112 and retained thereon by a nut 114 which is threaded on a lower threaded portion of the shoulder pin 112. The rock arm 113 has a bifurcated portion embracing an eye on the lower end of the control rod 108, and the control rod 108 and rock arm 113 are pivotally connected by a pin 115 extending through the bifurcated portion of the rock arm 113 and the eye of the control rod 108. The upward pull on the control rod 108 exerted by the coil spring 109 is transmitted to the tube 106 and to the selector shaft 92 through the rock arm 113, and the arm 94 on the selector shaft 92 is therefore resiliently urged into the notch 89 of the shifter shaft 82. In the neutral position of the transmission in which the notch 88 registers with the notch 89, as has been mentioned hereinbefore, the hand lever 101 may be swung upwardly about the pivot pin 102, and the resulting rocking movement of the selector shaft 92 will move the arm 94 into engagement with the notch 88 of the shifter shaft 81. When the hand lever 101 has been lifted, it may then be turned to rotate the tube 98 in the proper direction to move the shifter shaft 81 forwardly and bring the gear 26 into mesh with the large gear 67 of the reverse gear cluster 62, 67. On the other hand, the shiftable gear 46 may be moved into clutching engagement with the gear 47 by swinging the hand lever 101 in one direction without swinging it about the pivot pin 102, and the gear 46 may be moved into meshing engagement with the gear 27 by moving the hand lever 101 in the opposite direction without swinging it about the pivot pin 102. It will thus be seen that the range selecting gearing which, as stated, includes the shiftable gears 46 and 26 is controlled by the hand lever 101 which may be moved into three positions as follows. A first position to which it may be adjusted by rotation in one direction about the axis of the tube 98, without lifting the hand lever, and which first position establishes the low speed range; a second position to which it may be adjusted by rotation about the axis of the tube 98 in the opposite direction, without lifting the hand lever, and which second position establishes the high speed range; and a third position to which it may be adjusted by first swinging it upwardly about the pivot pin 102 and then rotating it about the axis of the tube 98 in the same direction in which it is turned in order to establish the low speed range, and which third position establishes the reverse speed range.

The control column 96 for the upper selector shaft 91 is a duplicate of the control column 97 and comprises a hand lever 116 pivoted at 120 on a rotatable head 125, the hand lever 116 being operable in the same manner as the hand lever 101 in order to shift and rock the selector shaft 91. A horizontally swingable arm 117 on the vertical tube of the control column 96 has a ball and socket connection 118 with a horizontal tube 119 which has a flexible joint connection 121 with the control shaft 91, and a vertical control rod 122 is pivotally connected at its lower end with a rock arm 123 secured to the tube 119 below the universal joint connection 118 in order to rock the selector shaft 91 in an anti-clockwise direction, as viewed in Fig. 2, about its axis by upward swinging movement of the hand lever 116. The control rod 122, like the control rod 108 of the range selecting mechanism is normally urged in an upward direction by a coil spring corresponding to the coil spring 109, and the arm 93 on the selector shaft 91 is therefore normally held in engagement with the notch 86 of the shifter shaft 78. Fig. 7 shows the hand lever 116 in a lifted position about its pivot center 120 on the head 125 of the control column 96, and turned so as to establish a driving connection between the speed selecting gear 16 and the counter gear 27. In order to interrupt the driving connection between the speed selecting gear 16 and the counter gear 27, the hand lever 116 is swung from the position in which it is shown in Fig. 7 so as to move the selector shaft 91 to the left in Fig. 7, and such movement will bring the notch 87 opposite to the notch 86. When the operator then takes his hand off the control lever 116 the latter drops about its pivot center 120 under its own weight and under the pressure of the coil spring in the control column 96, and the arm 93 moves into notch 86. When the outer end of the arm 93 rests against the bottom of the notch 86 the hand lever 116 occupies a neutral horizontal position corresponding to the neutral horizontal position in which the hand lever 101 is shown in Fig. 7. From the neutral position the hand lever 116 may be turned, without lifting it, in a direction opposite to that in which it has been moved in order to establish the driving connection between the gear 16 and the gear 27, and by such turning movement of the hand lever 116 the gear 17 may be moved into mesh with the gear 28. In order to move the gear 18 into mesh with the gear 31, the hand lever 116 is rotated from its neutral horizontal position without lifting it, in the same direction in which it is moved for engaging the gear 16 with the gear 27. The speed selecting gearing which, as stated, includes the gears 16, 17 and 18 may thus be controlled by the hand lever 116 independently of control of the range selecting gearing by the hand lever 101.

The speed selecting lever 116 and the range selecting lever 101 are each adjustable to three different positions, any one of which may be quickly and conveniently selected by the operator without looking at the controls. When operating at night the speed and range selector levers may be manipulated by the operator without difficulty or error to select any desired forward or reverse speed ratio.

Referring again to Fig. 1, and specifically to the driving gear 16 and the counter gear 27, it will be noted that the driving gear 16 in its neutral position, as shown, extends in a plane at one side of the counter gear 27 and that it is shiftable from said neutral position into mesh with said counter gear. The axially fixed driven gear 44 is spaced a predetermined distance axially from the axially fixed counter gear 27, and the gear 44 is located at the side of the mentioned plane, remote from the counter gear 27. In other words, the driving gear 16 is shiftable from a neutral position in a plane between the planes of the gears 27 and 44 into mesh with the counter gear 27.

It will further be noted that the counter gear 27 has a selectively operable forward drive connection with the driven shaft 37, namely, by means of the auxiliary gears 29, 47 and the driven gear 46; and the counter gear 27 also has a selectively operable reverse drive connection with the driven shaft 37, said reverse drive connection comprising the auxiliary gear 26, the driven gear 44 and the reverse idler 62, 67 which is arranged to mesh with the driven gear 44 and with the auxiliary gear 26. The gear section 62 of the reverse idler is in constant mesh, as stated, with the driven gear 44, and the other gear section 67 of the reverse idler extends in the mentioned plane at said one side of the counter gear 27, or in a plane between the planes of the gears 27 and 44. The combined length of the pitch radii of the gears 16 and 26 is shorter than the spacing between the axes of said gears, to permit rotation of said gears independently of each other when the gear 26 is moved into mesh with the gear section 67 of the reverse idler while the driving gear 16 is in its neutral position, and in which case the gears 16 and 26 are in a relatively overlapping position. Adjustment of the speed selecting lever 116 from its neutral to its first speed position while the range selecting lever 101 is in its reverse speed position, will be effective to shift the driving gear 16 from the mentioned overlapping position relative to the auxiliary gear 26 into mesh with the counter gear 27, and similarly, adjustment of the range selecting lever 101 from its reverse speed to its neutral position while the speed selecting lever 116 is in its neutral position, will be effective to move the auxiliary gear 26 out of the mentioned overlapping position relative to the driving gear 16.

Referring to the auxiliary gear 26 and the driven gear 44 it will further be noted that the combined length of the pitch radii of these gears is shorter than the spacing between their respective axes, to permit rotation of the gears 26 and 44 independently of each other when the gear 26 is in its neutral position, as shown in Fig. 1, and in which neutral position the gear 26 overlaps the gear 44. Adjustment of the range selecting lever 101 from its neutral to its reverse speed position will be effective to move the auxiliary gear 26 from the mentioned overlapping position relative to the gear 44 into mesh with the gear section 67 of the reverse idler.

The construction and arrangement of the selectively operable forward and reverse drive connections between the counter gear 27 and the driven shaft 37 has the advantage that the gears may readily be proportioned to provide for any desired speed ratio between the shafts 22 and 37 within relatively wide limits. In the present instance it is required, as stated, that the reverse speeds be substantially equal to the low forward speeds, and this requirement may readily be met by proportioning the reverse speed gears 26, 67, 62 and 44 and the forward speed gears 29 and 47 so that the gear ratio of the reverse gear train is substantially equal to the gear ratio of the gears 29 and 47.

As pointed out hereinbefore, the gears 16 and 26 are movable into an overlapping position, the gear 26 being, moreover, movable into an overlapping position relative to the gear 44, and the gear 46 is movable into an overlapping position relative to the gear 28. In this respect the disclosed gear arrangement has a further advantage in that it results in a relatively short axial length of the transmission.

While in the foregoing a preferred embodiment of the invention has been disclosed, it should be understood that it is not intended to limit the invention to the exact details of construction herein shown and described for various modifications within the scope of the appended claims may occur to persons skilled in the art.

It is claimed and desired to secure by Letters Patent:

1. In a transmission, a driving shaft, a driven shaft and a work shaft rotatable, respectively, about relatively spaced axes; speed selecting gearing comprising a plurality of driving gears coaxial with said driving shaft and a plurality of relatively non-rotatable counter gears alined on an axis spaced from the axes of said driving and driven shafts; means selectively operable to control the transmission of power from said driving shaft, through any one of said driving gears, to said counter gears; range selecting gearing comprising a first auxiliary gear coaxial with said counter gears, a second auxiliary gear coaxial with said driven shaft, adapted to mesh with said first auxiliary gear, a first driven gear coaxial with said driven shaft adapted to mesh with one of said counter gears, constantly meshing second and third driven gears non-rotatably connected, respectfully, to said driven and work shafts; means selectively operable to control the transmission of power from said counter gears, through said auxiliary gears and through said first driven gear, respectively, to said driven shaft; a third auxiliary gear coaxial with said counter gears, a reverse idler adapted to mesh with said third auxiliary gear and with said second driven gear, and means selectively operable to control the transmission of power from said counter gears through said third auxiliary gear and reverse idler to said second driven gear.

2. In a transmission, a driving shaft and a driven shaft rotatable, respectively, about relatively spaced axes; driving gears coaxial with said driving shaft; a series of drivingly interconnected gears rotatably mounted in radially offset positions relative to said driving and driven shafts; two of said interconnected gears being positioned in parallel planes at axially opposite sides, respectively, of a third gear of said series; means selectively operable to drivingly connect said driving gears, respectively, with said series of interconnected gears; an auxiliary gear coaxial with and rotatable independently of said driven shaft, in constant mesh with one of said two interconnected gears; a shiftable gear coaxial with and non-rotatable relative to said driven shaft adapted to occupy a neutral position in overlapping relation to said third of said interconnected gears and movable from said neutral position into mesh with the other of said two interconnected gears, the combined length of the pitch radii of said axially shiftable gear and of said third gear being shorter than the spacing between the axes of said third and shiftable gears to permit rotation of said third and shiftable gears, in their overlapping position, independently of each other; and clutch means associated, respectively, with said auxiliary and shiftable gears, engageable with each other by movement of said shiftable gear from said neutral position thereof towards said auxiliary gear.

3. In a transmission, a driving shaft and a driven shaft rotatable about relatively spaced axes; a driving gear on said driving shaft and an auxiliary gear rotatable about an axis spaced from the axes of said driving and driven shafts, at least one of said gears being axially shiftable relative to the other and the combined length of the pitch radii of said gears being shorter than the spacing between the axes of said gears, to permit rotation of said gears, in a relatively overlapping position, independently of each other; means for shifting said axially shiftable gear into and out of said overlapping position relative to the other; a counter gear coaxial with said auxiliary gear adapted to mesh with said driving gear; and selectively operable forward and reverse drive connections between said counter gear and said driven shaft; said reverse drive connection comprising a driven gear on said driven shaft and a reverse idler arranged to mesh with said driven gear and with said auxiliary gear while the latter and said driving gear are in said relatively overlapping position.

4. In a transmission, a driving shaft and a driven shaft rotatable about relatively spaced axes; a driving gear on said driving shaft and an auxiliary gear rotatable about an axis spaced from the axes of said driving and driven shafts, said driving gear being axially shiftable relative to said auxiliary gear and the combined length of the pitch radii of said gears being shorter than the spacing between the axes of said gears, to permit rotation of said gears, in a relatively overlapping position, independently of each other; a counter gear coaxial with said auxiliary gear adapted to mesh with said driving gear; means for shifting said driving gear from its overlapping position relative to said auxiliary gear into mesh with said counter gear; and selectively operable forward and reverse drive connections between said counter gear and said driven shaft; said reverse drive connection comprising a driven gear on said driven shaft and a reverse idler arranged to mesh with said driven gear and with said auxiliary gear while the latter and said driving gear are in said relatively overlapping position.

5. In a transmission, a driving shaft and a driven shaft rotatable about relatively spaced axes; a counter gear rotatable about an axis spaced from the axes of said driving and driven shafts; an axially shiftable driving gear on said driving shaft movable from a neutral position in a plane at one side of said counter gear into mesh with said counter gear; and selectively operable forward and reverse drive connections between said counter gear and said driven shaft, said reverse drive connection comprising a driven gear on said driven shaft, a reverse idler having a gear section in constant mesh with said driven gear and another gear section in said plane at said one side of said counter gear, and an auxiliary gear coaxial with and non-rotatable relative to said counter gear, axially shiftable into mesh with said other gear section of said reverse idler; the combined length of the pitch radii of said driving and auxiliary gears being shorter than the spacing between the axes of said driving shaft and of said auxiliary gear to permit rotation of said driving and auxiliary gears independently of each other in a relatively overlapping position in which said auxiliary gear is in mesh with said other gear section of said reverse idler, and in which said driving gear is in its neutral postion.

6. In a transmission, a driving shaft and a driven shaft rotatable about relatively spaced axes, an axially fixed counter gear rotatable about an axis spaced from the axes of said driving and driven shafts, an axially fixed driven gear on said driven shaft spaced a predetermined distance axially from said counter gear, a driving gear on said driving shaft shiftable from a neutral position in a plane between the planes of said driven and counter gears into mesh with said counter gear, and selectively operable forward and reverse drive connections between said counter gear and said driven shaft; said reverse drive connection comprising a reverse idler having a gear section in constant mesh with said driven gear and another gear section in said plane between said driven and counter gears, and an auxiliary gear coaxial with and non-rotatable relative to said counter gear, axially shiftable into mesh with said other gear section of said reverse idler; the combined length of the pitch radii of said driving and auxiliary gears being shorter than the spacing between the axes of said driving shaft and said auxiliary gear to permit rotation of said driving and auxiliary gears independently of each other in a relatively overlapping position in which said driving gear is in its neutral position and in which said auxiliary gear is in mesh with said other gear section of said reverse idler, and the combined length of the pitch radii of said auxiliary gear and of said driven gear being shorter than the spacing between the axes of said auxiliary gear and of said driven shaft to permit rotation of said auxiliary gear and of said driven gear independently of each other in a relatively overlapping position; and means for shifting said auxiliary gear from its overlapping position relative to said driven gear into mesh with said other gear section of said reverse idler.

7. In a transmission, a driving shaft and a driven shaft rotatable, respectively, about relatively spaced axes; speed selecting gearing comprising a plurality of driving gears coaxial with said driving shaft and an assembly of counter gears alined on an axis spaced from the axes of said driving and driven shafts; means selectively operable to control the transmission of power from said driving shaft, through any one of said driving gears, to said counter gear assembly; means selectively operable to establish and interrupt a forward speed driving connection between said counter gear assembly and said driven shaft; and means selectively operable to establish and interrupt a reverse speed driving connection between said counter gear assembly and said driven shaft, said last named means comprising a driven gear non-rotatably secured in axially fixed position on said driven shaft, a reverse idler having two gear sections and being permanently geared through one of said gear sections with said driven gear, and an auxiliary gear drivingly connected with said counter gear assembly and shiftable axially into and out of mesh with the other section of said reverse idler.

8. In a transmission, a driving shaft and a driven shaft rotatable, respectively, about relatively spaced axes; speed selecting gearing comprising a plurality of driving gears coaxial with said driving shaft and an assembly of counter gears alined on a counter shaft spaced from the axes of said driving and driven shafts; means selectively operable to control the transmission of power from said driving shaft, through said driving and counter gears, to said counter shaft; means operable to selectively establish a high forward speed and a low forward speed driving connection between said counter shaft and said driven shaft; and means selectively operable to establish and interrupt a reverse speed driving connection between said counter shaft and said driven shaft, said last named means comprising a driven gear non-rotatably secured in axially fixed position on said driven shaft, a reverse idler having two gear sections and being permanently meshed through one of said gear sections with said driven gear, and an auxiliary gear non-rotatably mounted on said counter shaft and shiftable axially thereof into and out of mesh with the other section of said reverse idler.

9. In a transmission, a driving shaft, a driven shaft and a work shaft rotatable, respectively, about relatively spaced axes; speed selecting gearing comprising a plurality of driving gears coaxial with said driving shaft and an assembly of counter gears alined on an axis spaced from the axes of said driving and driven shafts; means selectively operable to control the transmission of power from said driving shaft, through any one of said driving gears, to said counter gear assembly; means selectively operable to establish and interrupt a forward speed driving connection between said counter gear assembly and said driven shaft; a driven gear non-rotatably secured in axially fixed position on said driven shaft and drivingly connected with said work shaft, a reverse idler having two gear sections and being permanently geared through one of said gear sections with said driven gear, and an auxiliary gear drivingly connected with said counter gear assembly and shiftable axially into and out of mesh with the other section of said reverse idler.

10. In a transmission, a driving shaft and a driven shaft rotatable, respectively, about relatively spaced axes; a counter shaft rotatable about an axis spaced from the axes of said driving and driven shafts, speed selecting gearing between said driving and counter shafts including a counter gear non-rotatably secured to said counter shaft, and range selecting gearing between said counter shaft and said driven shaft, said range selecting gearing comprising, a first auxiliary gear non-rotatably secured to said counter shaft, a second auxiliary gear rotatably mounted on said driven shaft and in constant mesh with said first auxiliary gear, a first driven gear non-rotatably mounted on said driven shaft for shifting movement axially thereof in one direction into mesh with said counter gear, clutch means operable upon shifting movement of said first driven gear in the opposite direction to drivingly connect said second auxiliary gear with said driven shaft, a second driven gear non-rotatably secured in axially fixed position on said driven shaft, a reverse idler having two gear sections and permanently geared through one of said gear sections with said second driven gear, and a third auxiliary gear non-rotatably secured to said counter shaft and shiftable axially thereof into and out of mesh with the other gear section of said reverse idler.

LOUIS JACOBI.